(12) United States Patent
Derstadt (10) Patent No.: US 11,960,471 B2
(45) Date of Patent: *Apr. 16, 2024

(54) USING LINEAGE TO INFER DATA QUALITY ISSUES

(71) Applicant: Microsoft Technology Licensing, LLC, Redmond, WA (US)

(72) Inventor: Jeffrey Michael Derstadt, Sammamish, WA (US)

(73) Assignee: Microsoft Technology Licensing, LLC., Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/816,397

(22) Filed: Jul. 29, 2022

(65) Prior Publication Data

US 2022/0365923 A1  Nov. 17, 2022

Related U.S. Application Data

(63) Continuation of application No. 17/089,604, filed on Nov. 4, 2020, now Pat. No. 11,423,011, which is a continuation of application No. 14/264,966, filed on Apr. 29, 2014, now Pat. No. 10,877,955.

(51) Int. Cl.
*G06F 16/68* (2019.01)
*G06F 16/23* (2019.01)

(52) U.S. Cl.
CPC ................ *G06F 16/2365* (2019.01)

(58) Field of Classification Search
None
See application file for complete search history.

(56) References Cited

U.S. PATENT DOCUMENTS

2011/0313812 A1* 12/2011 Duvvoori ........... G06Q 10/0633
  705/7.27
2014/0033001 A1* 1/2014 Zhang ................ H03M 13/1128
  714/799

* cited by examiner

*Primary Examiner* — Thu N Nguyen
(74) *Attorney, Agent, or Firm* — Barta Jones, PLLC (57) ABSTRACT

Identifying data quality along a data flow. A method includes identifying quality metadata for two or more datasets. The quality metadata defines one or more of quality of a data source, accuracy of a dataset, completeness of a dataset, freshness of a dataset, or relevance of a dataset. At least some of the metadata is based on results of operations along a data flow. Based on the metadata, the method includes creating one or more quality indexes for the datasets. The one or more quality indexes include a characterization of quality of two or more datasets.

20 Claims, 4 Drawing Sheets

USING LINEAGE TO INFER DATA QUALITY ISSUES

RELATED APPLICATION

This application is a continuation of and claims priority to U.S. application Ser. No. 17/089,604, entitled "USING LINEAGE TO INFER DATA QUALITY ISSUES," filed Nov. 4, 2020, which is a continuation of, and claims priority to U.S. application Ser. No. 14/264,966 (now U.S. Pat. No. 10,877,955), entitled "USING LINEAGE TO INFER DATA QUALITY ISSUES," filed Apr. 29, 2014 the disclosures of which are incorporated herein by reference in their entireties.

BACKGROUND

Computers and computing systems have affected nearly every aspect of modern living. Computers are generally involved in work, recreation, healthcare, transportation, entertainment, household management, etc.

Quality is an important characteristic in building trust with a set of computing data. There are many tools for assessing the quality of a given dataset and for suggesting or automatically improving the quality of the data in a dataset. However, these tools perform specific actions on the dataset itself, which itself requires that the tool has direct access to the dataset in its entirety.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a data processing environment with data flowing from one or more sources through a plurality of operations, a method of identifying data quality along the data flow. The method includes identifying quality metadata for two or more datasets. The quality metadata defines one or more of quality of a data source, accuracy of a dataset, completeness of a dataset, freshness of a dataset, or relevance of a dataset. At least some of the metadata is based on results of operations along a data flow. Based on the metadata, the method includes creating one or more quality indexes for the datasets. The one or more quality indexes includes a characterization of quality of two or more datasets.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein use an inferred approach to asserting the quality of a dataset so that direct access to the data contained in the dataset is not needed. While this is not an authoritative assertion of quality, this metric can be used by data consumers to inform their level of trust with a dataset In some embodiments, the lineage of a data source is used to infer the quality of the data source and also to report quality issues of a data source. Metadata about datasets can be associated with the datasets based on the lineage of the data and/or operations performed on the data.

Figure 1:
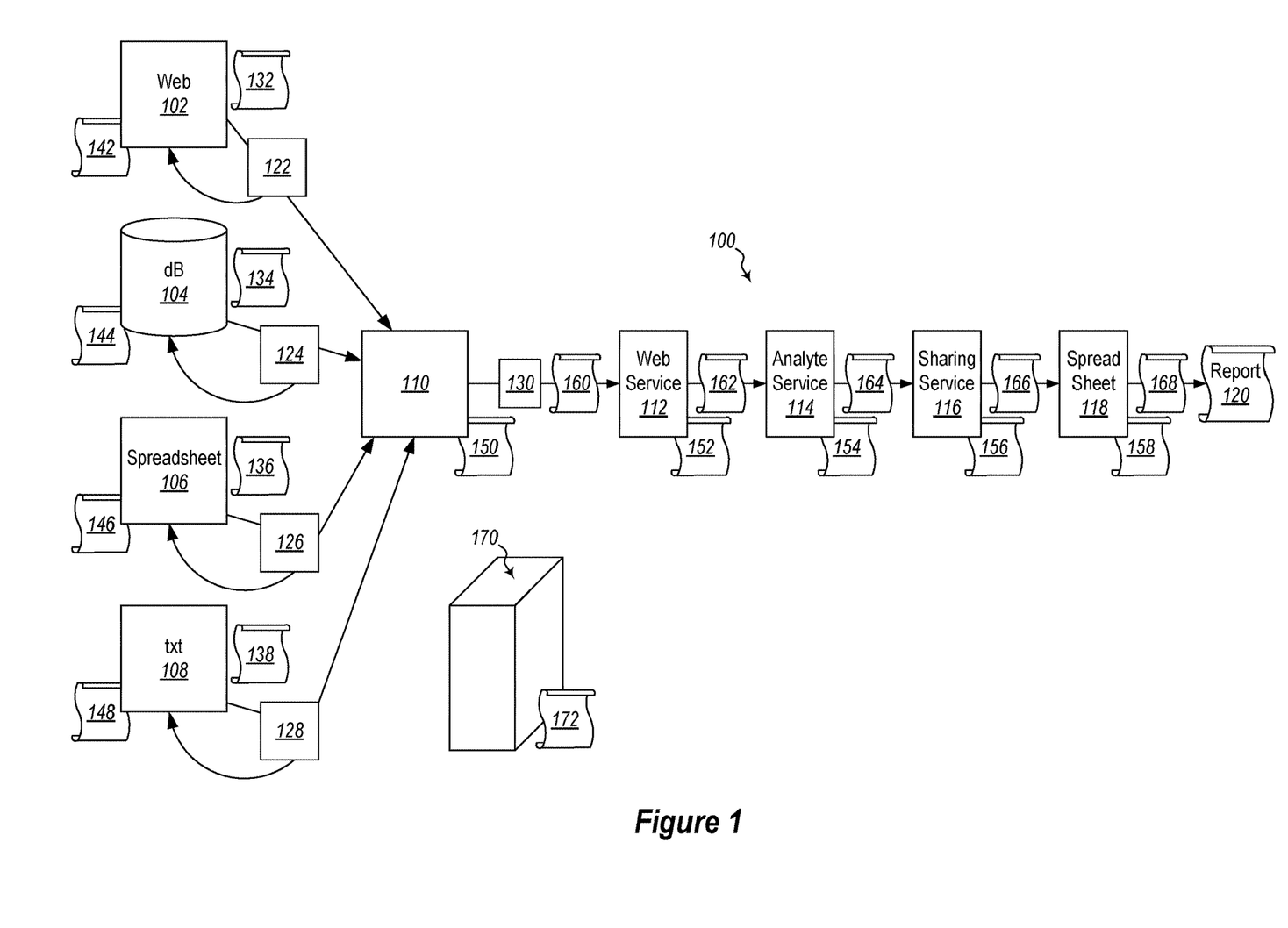
FIG. 1 illustrates a dataflow of data through various operations.

Data lineage is the representation of how data moves through a system of connected data stores. An example is illustrated in FIG. 1. FIG. 1 illustrates various data sources including a web source 102, a database source 104, a spreadsheet source 106, and a text source (such as a text document) 108. Data from one or more of the sources may pass through one or more ETL (extract—transfer—load) processes (such as those in SQL Server® Integration Services, available from Microsoft Corporation of Redmond, Washington), illustrated generally at 110. Various forms of input data may further travel along a dataflow 100 such as for example through a web service 112, to an analytic service 114, through a sharing service 116, through another spreadsheet 118, and finally be incorporated into a report 120.

In this case, the lineage of the data includes the web source 102, the database source 104, the spreadsheet source 106, the text source 108, the processes 110, the web service 112, the analytic service 114, the sharing service 116, and the spreadsheet 118. At each point in the lineage, the data has the opportunity to be transformed or changed.

Data sources, transformation, and/or operations can also be annotated with metadata. For example, FIG. 1 illustrates each of the data sources 102, 104, 106, and 108 associated with metadata 142, 144, 146, and 148 respectively. One piece of metadata that can be captured is the data quality level of the data in the data source. Data quality, can, but does not necessarily have a pre-defined metric. This metric can be a simple enumeration of High, Medium, or Low, or it can be a percent correct, a percent that follow a certain pattern, a percent complete, a relevance score, a freshness score, a grading based on granularity available, a precision score, etc.

In particular, data quality may be related to any of a number of different factors. One such factor may be correctness of data. For example, data should accurately reflect what it purports to represent without errors.

Another factor may be completeness. Completeness relates to the inclusion of what might be considered important, necessary, and/or useful to be included in a dataset. For example, address data should include street address, zip code, city, and state. If these cannot be identified in a data set, the data set may be of a lower quality. On a larger scale, a data set may have reports from several entities. If certain reports from certain entities are not included, then the data may have a lower quality as not being complete. On an even larger scale, statistical data may be included for countries. If data for one or more countries is missing, then the data may be determined to not be complete.

Another factor may be relevance. Relevance could represent any one of a number of different things. For example, more socially "popular" data sources may be more relevant than other sources. Relevance may also be determined based on context. For example, in a system dealing with scientific observations, a data source mostly dedicated to music sales might be of less relevance.

Another factor may be freshness. Freshness refers to how recent the data is. This factor may vary based on the data source. For example, a data source having historical facts may not need to be updated as often as a current stock price data source to be considered "fresh".

Another factor may be granularity of what data is available. For example, a data source may be able to provide a broad range of granularity such as data representing an aggregation of data points as well as data about the individual data points. For example, a coarse granularity of data might indicate that 500,000 people purchased a particular product. A much finer granularity of data might indicate that Joe Smith purchased the particular product. Data stores able to provide a broad range of granularity may be higher quality data stores. Alternatively, data stores able to provide finer granularity of data (e.g. lower-level or more precise data) may be higher quality data sources than those that provide coarser granularity of data, as the coarser granularity data can be easily created from fine granularity data.

Another factor may be precision. For example, data sources that provide data that is more precise may be of higher quality. For example, if a system provides scientific measurement data, a system that provides finer precision may be a higher quality system that one with more coarse precision.

Another factor may be reputation of a data source. For example, a well-known and respected news source may be annotated as having high quality data while a lesser known news source may be identified as having lower quality data.

Yet another factor may be related to who prepared, used, or otherwise interacted with the dataset. For example, the reputation or stature of the owner of the dataset may be taken into account. Alternatively or additionally, entities who have been looking or using a dataset (and in some cases how they use the dataset) may be used to determine quality or relevance. Embodiments may allow for a sort of "crowd source" quality assessment.

Determinations as to the quality of a dataset may be made in any of a number of different ways. For example, simple threshold or comparisons may be made to assign a data source a data quality rating. Alternatively, Bayesian inference or machine learning may be used to resolve data source ratings. In another example, a user can manually determine quality and make an assignment of a data source quality rating.

Data sources can also be annotated with information about whether they are a data cleansing process which can occur as part of a data transform or as an action taken on a specific data source. For example, FIG. 1 illustrates that the web source 102, the database source 104, the spreadsheet source 106, and the text source 108 each have associated with them a data cleansing process 122, 124, 126, 128 respectively. The data cleansing processes 122 through 128 are configured to automatically identify and correct problems with data from the data sources 102 through 108. Thus for example, datasets 132, 134, 136, and 138 can be sent from data sources 102, 104, 106, and 108 respectively. The data sources have associated with them data cleansing processes 122, 124, 126, and 128. The data cleansing processes 122, 124, 126, and 128, can receive the datasets 132, 134, 136, and 138 respectively, and identify issues such as incorrect or corrupted data, incomplete data, outdated data, non-relevant data, etc. and can perform corrective techniques such as filtering, data supplementation, re-requesting data, etc. to improve the quality of the datasets 132 through 138. FIG. 1 also illustrates a manual data cleansing process 130. The manual data cleansing process 130 can be initiated by a user to perform various data cleansing or verification processes.

Using data lineage and information about data sources and annotating data assets with metadata about data quality, it is possible to use inference, machine learning, or other techniques to determine relative measures of data quality for datasets where no explicit assertion has been made. One can also use these techniques to infer data quality reporting problems or report on how resources allocation is being used with respect to maintaining data quality. This can be used to improve data quality reporting and/or resource utilization directed to data quality improvement.

DETERMINING DATA QUALITY

Figure 2A:
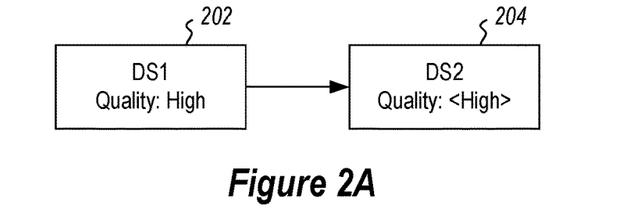
FIG. 2A illustrates an example of determining dataset quality.

Most basically, data quality can be inferred from assertions about quality from which the data flows. For example, reference is directed to FIG. 2A. In FIG. 2A, the quality of the dataset DS2 illustrated at 202 is inferred to be <high> because the quality of the incoming data from the dataset DS1 illustrated at 204 is known to be high. A similar inference can be made with a low quality data source.

Figure 2B:
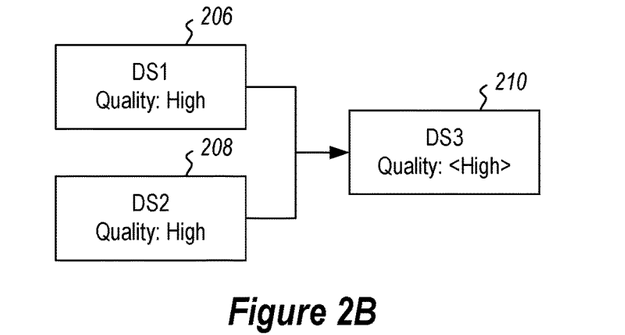
FIG. 2B illustrates an example of determining dataset quality.

When there are multiple data sources, an inference can be made when all of the incoming data sources agree on the quality of the incoming data. For example, FIG. 2B illustrates an example where a dataset DS1 illustrated at 206 and a dataset DS2 illustrated at 208 are both high quality datasets. As such, a dataset DS3 illustrated at 210 derived from the datasets DS1 and DS2 can also be inferred to be a <high> quality dataset.

In alternative embodiments, various other algorithms may be used to determine data quality. For example, complex algorithms may be able to make a determination as to data quality based on the type of source, the quality of the source, the particular mix of sources being used (e.g. low quality sources that complement each other could be used to create high quality data, alternatively high quality sources that are deleterious to each other may actually cause output data to be low quality), etc. In some embodiments, these determinations may be accomplished using machine learning and/or statistical analysis, such as Bayesian inference.

REPORTING DATA QUALITY ISSUES

Figure 2C:
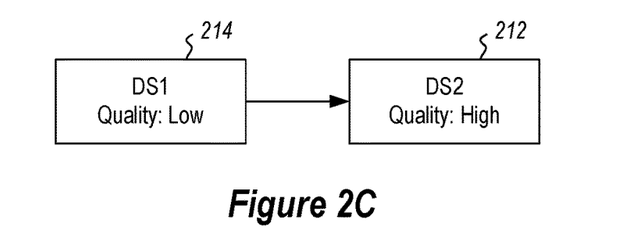
FIG. 2C illustrates an example of determining dataset quality.

Embodiments can include functionality for detecting data quality issues. Just as inferences can be made about the quality of a dataset, a system can detect potential quality problems when an inference or other determination of data quality does not match what is otherwise asserted about a dataset. For example, as illustrated in FIG. 2C, when a data source DS2 illustrated at 212 is annotated as having a high data quality, but is fed by a data source DS1 illustrated at 214 that has a low data quality and no data cleansing process is present, the system can report that that data source DS2 may have an inaccurate data source annotation of "high". This same principle applies whether the incoming data source is from a single source or multiple data sources.

Reporting may include generating a data quality index that includes indications of quality for different datasets. For example, as illustrated in FIG. 1, a computing system 170 may be configured to gather quality metadata 142, 144, 146, and 148 from the sources 102-108 respectively. The computing system 170 may also be able to gather quality metadata 150, 152, 154 156, and 158 from various services 110, 112, 114, 116, and 118 respectively that indicates expected quality of datasets (or in some cases, actual measured or otherwise determined quality of datasets). The quality metadata can be assembled into one or more indexes, such as index 172, that can be used for evaluation purposes. As explained in other portions of this document, the index can be used to determine where cleansing resources are being used, when cleansing resources are ineffective, discrepancies between expected data quality and actual data quality, etc. In some embodiments, the index can be used in system learning, such as, for example, via a machine learning process or explicit rule. For example, learning process or rule may note that the combination of two 'low' quality datasets combined in a particular way can produce a high quality dataset as output. Whenever the system observes this pattern being used again (those same two low datasets being combined in the same way), the new output is also likely high quality

REPORTING RESOURCE ALLOCATION OR PROBLEMS WITH CLEANSING

Based on annotations about data cleansing processes, it is possible to generate a report of where cleansing is taking place. With such information, determinations can be made about data cleansing resources. For example, embodiments can determine if data cleansing resources are being used efficiently. For example, an embodiment can determine if data cleansing resources are being allocated on high business impact data sources or low business impact data sources. This is done simply by querying for where data cleansing processes are in a system and correlating this information with knowledge about the business impact of a data source.

If cleansing resources are not being used effectively, the resources can be reallocated. For example, if it is determined that cleansing resources are being used on low business impact data, the cleansing resources could be moved to higher impact data.

Similar detection and allocation could be performed for other datasets based on other factors. For example, it may be desirable to allocate data cleansing resources based on frequency of use of the dataset. For example, data cleansing resources may be more effectively used on datasets that are accessed more often rather than those of that are used less often. Similar embodiments may be implemented in social networking environments. For example, datasets that are shared or "liked" more often may be benefited by allocating data cleansing resources to clean such datasets while the allocating resources to datasets that are shared or "liked" less often.

In another example, datasets used by high level end users may have preference for high quality over datasets that are only used by lower level users. For example, the CEO of a company may review certain reports. It may be important for these reports to be assembled using high quality datasets. Thus, if it can be determined that data cleansing resources are being used for lower level employees, the data cleansing resources can be reallocated for datasets used to create reports for the CEO or other upper level management.

Embodiments can determine the effectiveness of data cleansing processes and where "low quality" data is being introduced. This can be done by looking for lineage patterns where data comes out of a data cleansing process and flows to a data source that is still marked as having a "low" data quality. In these cases, any cleansing process is either ineffective or there is a new, undocumented source of low quality data being introduced that can be addressed.

Figure 2D:
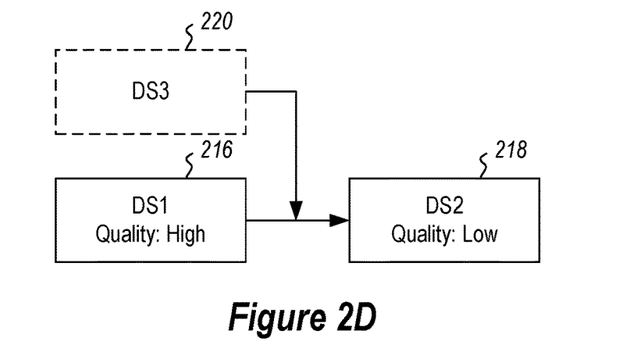
FIG. 2D illustrates an example of determining dataset quality.

For example, FIG. 2D illustrates an example where a dataset DS1 illustrated at 216 marked as having high quality data is used to create a dataset DS2 illustrated at 218 identified as having low quality data. For example, an audit may be performed on the dataset DS2 illustrated at 218 to determine the quality of the data in the dataset. However, simply using the lineage information yields incorrect quality information about the dataset DS2 illustrated at 218. This may be caused, for example by another unknown dataset DS3 illustrated in phantom at 220 that introduces lower quality data into the dataset DS2 illustrated at 218.

Alternatively, there may be some transformation process (not shown) used in creating the dataset DS2 illustrated at 218 from the dataset DS1 illustrated at 216 which degrades the quality of the dataset DS2. For example, the transformation may incorrectly perform a calculation, remove important portions of a data item (e.g. all zip codes from addresses), introduce indexing errors, perform invalid calculations (e.g. multiplying all revenue by 2), etc.

Figure 2E:
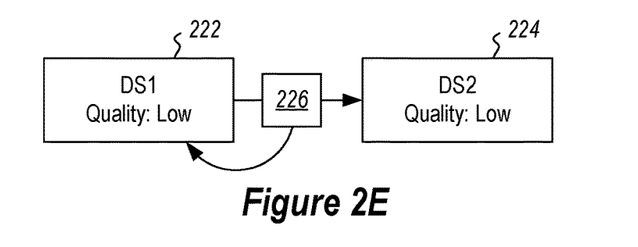
FIG. 2E illustrates an example of determining dataset quality.

Alternatively, as illustrated at FIG. 2E, a cleansing process may not be providing a desired effect. For example, as illustrated in FIG. 2E, a dataset DS1 illustrated at 222 is shown as being low quality. The dataset DS1 is used to create a dataset DS2, which is also identified as being of low quality. A cleansing process 226 is applied to the dataset DS1 illustrated at 222. However, the dataset DS2 is still identified as being of low quality. However, inference or other determination techniques may indicate that the dataset DS2 at 224 should be high quality. The difference between the actual quality of the data and the inferred quality of the data may indicate a problem with the cleansing process 226 which may need to be troubleshot.

Figure 3:
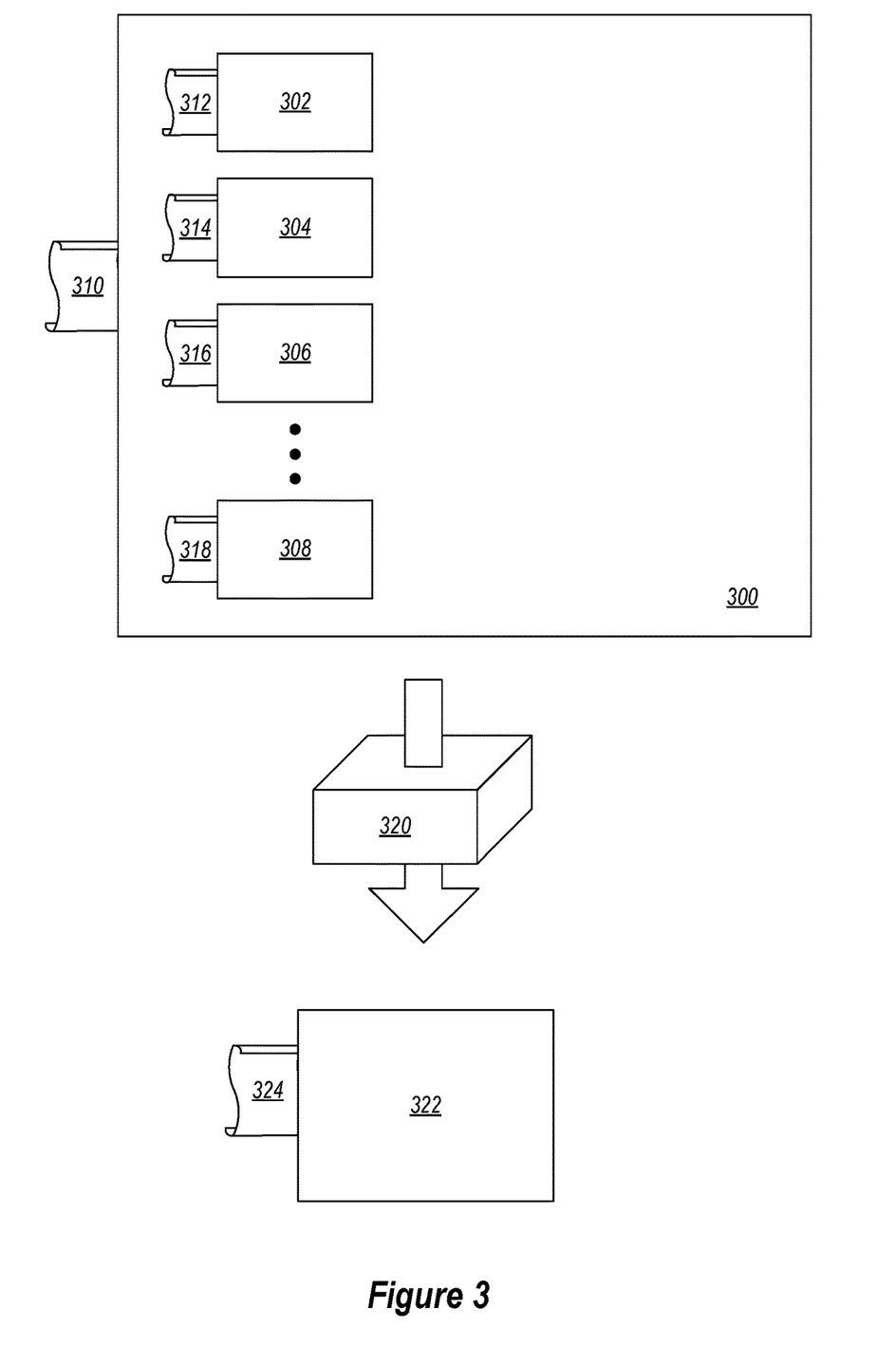
FIG. 3 illustrates a dataset that is composed of a number of different datasets, where each dataset has its own quality associated with it.

In some embodiments, a dataset may be of one quality level while sub-components of the dataset may be of different levels. For example, FIG. 3 illustrates a dataset 300 having associated with it metadata 310 indicating the quality of the data in the dataset 300. FIG. 3 also illustrates a number of other datasets 302, 304, 306, and 308 that are part of the dataset 300. Each of the sub datasets 302, 304, 306, and 308 have associated with them metadata in the metadata 310 (or in separate metadata 312, 314, 316 and 318 respectively) that identify data quality for the sub datasets. For example, the dataset 300 may have generally a high quality, but may include sub datasets (one or more of 302, 304, 306, or 308) that have lower qualities.

Thus, embodiments may implement a two-dimension (or multiple dimension) quality index for datasets and their respective sub-datasets. Thus, for example, a lineage signature (e.g. metadata) associated with a dataset includes information of a data quality index for that dataset and a data quality index for each of a plurality of sub-datasets of the dataset.

Illustratively, the dataset 300 may be a database. The database may include a number of different columns represented by the datasets 302, 304, 306 and 308. Certain columns may have incomplete rows or rows which are not presently available. For example, certain rows of a column may be locked by a transactional process or otherwise unavailable. Alternatively a column may have missing data for one or more rows. Any such column may be marked in metadata as having a lower quality.

In another example, the dataset 300 may include a store of flat files represented by the datasets 302, 304, 306 and 308. Certain of the flat files may be incomplete or otherwise have undesirable characteristics. For example, certain files may be in draft form. Alternatively, certain files may be corrupted. Alternatively, certain files may have less detail. While the dataset 300 may be of an overall quality, individual datasets within the dataset 300 may be of higher or lower qualities than the overall quality.

Thus data extracted from dataset 300 may have different quality depending on what data is extracted. Thus, even though the dataset 300 may be annotated as having a certain quality, a different quality may actually be realized when different portions of the dataset 300 are used.

Embodiments could ensure that data provided by the dataset 300 is high quality by selecting only sub datasets that are also marked as being of high quality. Notably, the dataset 300 may be marked as low quality, but could still provide high quality data by selecting sub datasets with high quality data. Alternatively, two (or more) low quality sub-datasets that have complementary data could be used to create a higher quality dataset if the two (or more) datasets can compensate for each other's deficiencies.

Alternatively, embodiments may wish to custom tailor a quality level. This can be done by selectively choosing datasets of appropriate quality to generate an output set of a particular quality. For example, there may be cases where a data vendor provides different levels of data at different costs. The data vendor can customize the quality of the output data by appropriate selection of data from sub datasets. Thus, for example, a data vendor could provide premium data by only selecting data from high quality datasets within the dataset 300. Alternatively, a vendor could provide low priced data by only providing data from low quality datasets within the dataset 300. Alternatively, a data vendor could provide moderately priced data by using moderate quality data in the dataset 300 or by mixing data from different datasets within the dataset 300 to obtain the appropriate quality level.

Thus, embodiments may perform operations 320 against an input dataset 300 and generate an output dataset 322. Embodiments may selectively adjust the data quality of the output dataset 322 to be higher or lower than the quality of the input dataset 300 depending on the quality of sub-datasets involved in generating the output dataset.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
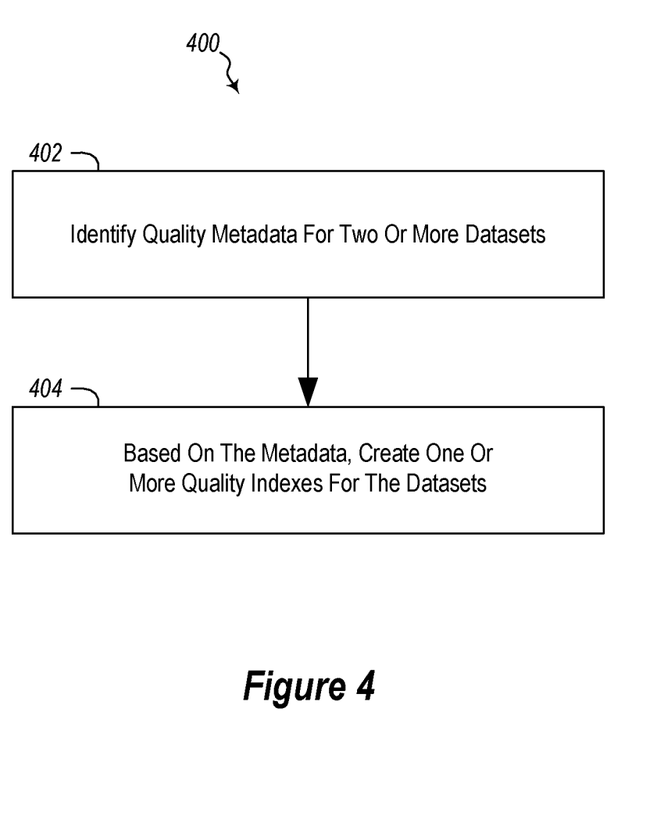
FIG. 4 illustrates a method of identifying data quality along a data flow

Referring now to FIG. 4, a method 400 is illustrated. The method 400 may be practiced in a data processing environment with data flowing from one or more sources through a plurality of operations. For example as illustrated in FIG. 1, data flows from sources 102-108 through various operations at various services 110-118 to generate a report 120. The method includes acts for identifying data quality along the data flow. The method includes identifying quality metadata for two or more datasets (act 402). The quality metadata defines, for example, one or more of quality of a data source, accuracy of a dataset, completeness of a dataset, freshness of a dataset, relevance of a dataset, etc. At least some of the metadata is based on results of operations along a data flow. For example as illustrated in FIG. 1, datasets 132-138 are illustrated as coming from sources 102-108 respectively. However, additional datasets 160, 162, 164, 166 and 168 may be produced, at the services 110, 112, 114, 116, and 118 respectively, using the datasets 132-138. Thus, quality metadata for the datasets includes some data based on metadata about sources and/or services in a dataflow.

The method 400 further includes, based on the metadata, creating one or more quality indexes for the datasets (act 404). The one or more quality indexes include a characterization of quality of two or more datasets. For example, FIG. 1 illustrates a quality index 172.

The method 400 may further include, based on the quality indexes, identifying one or more of positive, negative, neutral or unknown effects of one or more given operations in the data flow. For example, if a dataset is identified as having low quality, an operation is performed on the data to produce a new dataset with high quality, it can be determined that the operation has a positive effect.

The method 400 may further include, based on the quality indexes, identifying incorrect metadata. For example, if a dataset identified as being of high quality is run through an operation that is known to be a neutral process for the dataset, and a dataset produced by the operation is found to be of low quality, it can be determined that quality metadata is incorrect. For example, the dataset input to the process may be of low quality instead of the high quality identified.

The 400 may further include, based on the quality indexes, providing a real time indication of an operation result. For example, a user interface may be able to indicate an operations effectiveness by some indication, such as for example, a green shading on a representation of the operation, or some other visual indication indicating the operations effectiveness. If the operation does not perform a desired function with respect to data quality, a representation of the operation may be indicated with a red shading or other appropriate output.

The method 400 may further include, based on the quality indexes, generating reports for operations. For example, a list of a set of operations may be generated. The list may indicate for each operation, that the operation is generally good, bad, neutral or that the effects of the operation are unknown. Alternatively or additionally, a report may indicate a quantitative value indicating quantitatively how effective an operation is. This can be used to identify operations that may need to have corrective actions applied to improve the operation's effectiveness.

The method 400 may further include, based on the quality indexes, identifying operations to be applied to different data flows. For example, dataflows that have deleterious effect on data quality may be identified. These dataflows may be identified as being good candidates for have having data cleansing processes applied to them.

The method 400 may further include, based on the quality indexes, identifying resources that are being underutilized. For example, data cleansing processes that are being used to clean data that is lower value than other data, data that is used less than other data, etc. can be identified and move to be applied to data that has a higher value than other data, data that is more often used than other data, etc.

The method 400 may further include, based on the quality indexes, determining high quality operations based on a quality of a dataset. For example, certain operations are good, or high quality, for use with low quality data because the low quality data has enough information for the particular operation. For example, the particular operations identified may be only focused on high quality aspects of the low quality dataset. For example, a dataset may be quite complete in some aspects, but less complete in others. Thus, overall the dataset is of low quality, but the complete aspects of the dataset are of high quality.

The method 400 may be practiced where the one or more quality indexes comprises an index including quality information for a larger dataset as a whole as well as quality information for sub-datasets in the larger dataset. For example, as illustrated above in FIG. 3 above, one quality may be identified for the dataset 300 while distinct qualities may be identified for the datasets 312, 314, 316 and 318 that make up the dataset 300. In some such embodiments, such a method may further include performing an operation on two or more of the sub-datasets to create an output dataset. The method may further include identifying a quality for the output dataset based on the quality of the two or more sub-datasets used to create the output dataset. Thus, for example, a high quality output dataset may be created from a low quality dataset by using high quality constituent pieces of the dataset.

The method 400 may further include getting a high value set from two or more low value sets. For example, two datasets that are low value datasets due to being low quality datasets may be combined in such as way so as to create one or more high value datasets.

In some embodiments the method may be used to create datasets of different values. For example, an actual monetary value may be assigned to a dataset based on the quality of data used to create the dataset. In some embodiments, custom values can be created by knowing the quality of datasets used to create a composite dataset. For example, a consumer at a data market may be able to select between bronze quality data, silver quality data, gold quality data, or platinum quality data. The data market can custom tune the data quality by knowing the quality of input datasets to create data for the data consumer at the data market.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    performing an operation to generate a first dataset at a first data source from a second dataset at a second data source;
    identifying quality metadata for at least one of the second dataset or the second data source;
    inferring, from the quality metadata, an inferred quality of metadata of the first dataset such that the inferred quality of the first dataset can be inferred without direct access to data in the first dataset;
    determining an actual quality of the data in the first dataset;
    comparing the inferred quality of the data and the actual quality of the first dataset to identify differences in the inferred quality of the first dataset and the actual quality of the first dataset; and
    based on the differences between the inferred quality of the first dataset compared with the actual quality of the first dataset, displaying, on a user interface, an indication of an effectiveness of at least one operation in a data flow.

2. The method of claim 1 further comprising, based on the inferred quality of the first dataset compared with the actual quality of the first dataset, identifying one or more of positive, negative, neutral or unknown effects of one or more given operations in the data flow.

3. The method of claim 1 further comprising, based on the inferred quality of the first dataset compared with the actual quality of the first dataset, identifying incorrect quality metadata.

4. The method of claim 1 further comprising, based on the inferred quality of the first dataset compared with the actual quality of the first dataset, generating reports for operations in the data flow.

5. The method of claim 1 further comprising, based on the inferred quality of the first dataset compared with the actual quality of the first dataset, identifying operations to be applied to different data flows.

6. The method of claim 1 further comprising, based on the inferred quality of the first dataset compared with the actual quality of the first dataset, identifying resources that are at least one of being underutilized or are ineffective.

7. The method of claim 1 further comprising:
    selecting two or more datasets based on quality information;
    using the two or more datasets to create an output dataset with a custom tailored quality level based at least on the quality information of the two or more datasets; and
    performing at least one operation on the two or more datasets to create an output dataset with a custom tailored quality level determined by the quality information.

8. A computer program product comprising a computer storage device containing computer-executable instructions which, when executed by one or more processors, cause the one or more processors to perform a computer-implemented method comprising:
    performing an operation to generate a first dataset at a first data source from a second dataset at a second data source;
    identifying quality metadata for at least one of the second dataset, or the second data source,
    inferring, from the quality metadata, an inferred quality of metadata of the first dataset such that the inferred quality of the first dataset can be inferred without direct access to data in the first dataset;
    determining an actual quality of the data in the first dataset;
    comparing the inferred quality of the first dataset to the actual quality of the first dataset to identify differences in the inferred quality of the first dataset and the actual quality of the first dataset; and
    based on the differences between the inferred quality of the first dataset compared with the actual quality of the first dataset, displaying on a user interface an indication of an effectiveness of at least one operation in a data flow.

9. The computer program product of claim 8 wherein the computer-implemented method further comprises, based on the inferred quality of the first dataset compared with the actual quality of the first dataset, identifying one or more of positive, negative, neutral or unknown effects of one or more given operations in the data flow.

10. The computer program product of claim 8 wherein the computer-implemented method further comprises, based on the inferred quality of the first dataset compared with the actual quality of the first dataset, identifying incorrect metadata.

11. The computer program product of claim 8 wherein the computer-implemented method further comprises, based on the inferred quality of the first dataset compared with the actual quality of the first dataset, identifying resources that are at least one of being underutilized or are ineffective.

12. The computer program product of claim 8 wherein the computer-implemented method further comprises, based on the inferred quality of the first dataset compared with the actual quality of the first dataset, determining high quality operations.

13. The computer program product of claim 8 wherein the computer-implemented method further comprises generating a quality index comprising quality information for a larger dataset as a whole as well as quality information for sub-datasets in the larger dataset.

14. The computer program product of claim 13 wherein the computer-implemented method further comprises:
selecting two or more sub-datasets based on quality information in the quality index to be used to create an output dataset with a custom tailored quality level dependent on the quality information stored in the quality index; and
performing at least one operation on the two or more sub-datasets to create an output dataset with a custom tailored quality level determined by quality information in the quality index for the two or more sub-datasets.

15. A computing system comprising:
one or more processors;
a computer program product comprising a computer storage device containing computer-executable instructions which, when executed by one or more processors, cause the one or more processors to implement a computer-implemented method comprising:
performing an operation to generate a first dataset at a first data source for a data flow from a second dataset at a second data source in the data flow;
identifying quality metadata for at least one of the second dataset, or the second data source, the quality metadata defining one or more of the following:
quality of the second data source in the data flow,
correctness of the second dataset by defining a measure of how well the second dataset accurately reflects what the second dataset purports to represent without errors,
completeness of the second dataset by defining a measure of inclusion of predetermined elements in the second dataset,
freshness of the second dataset by defining a measure of how recently data in the second dataset was produced with respect to how often data in the second dataset is expected to change, or
relevance of the second dataset by defining a measure of at least one of popularity of the second dataset or contextual relevance of the second dataset to a system in which the second dataset is implemented;
inferring, from the quality metadata, an inferred quality of metadata of the first dataset such that the inferred quality of the first dataset can be inferred without direct access to data in the first dataset;
determining an actual quality of the data in the first dataset;
comparing the inferred quality of the first dataset to the actual quality of the first dataset to identify differences in the inferred quality of the first dataset and the actual quality of the first dataset; and
based on the differences between the inferred quality of the first dataset compared with the actual quality of the first dataset, displaying on a user interface an indication of an effectiveness of at least one operation in the data flow.

16. The system of claim 15, wherein the quality metadata defines quality of the second data source in the dataflow.

17. The system of claim 15, wherein the quality metadata defines correctness of the second dataset by defining a measure of how well a dataset accurately reflects what the second dataset purports to represent without errors.

18. The system of claim 15 wherein the quality metadata defines completeness of the second dataset by defining a measure of inclusion of predetermined elements in the second dataset.

19. The system of claim 15, wherein the quality metadata defines freshness of the second dataset by defining a measure of how recently data in the second dataset was produced with respect to how often data in the second dataset is expected to change.

20. The system of claim 15, wherein the quality metadata defines relevance of the second dataset by defining a measure of at least one of popularity of the second dataset or contextual relevance of the second dataset to a system in which the second dataset is implemented.

\* \* \* \* \*